(No Model.)
F. A. BISHOP.
ROTARY WATER METER.
No. 432,929. Patented July 22, 1890.
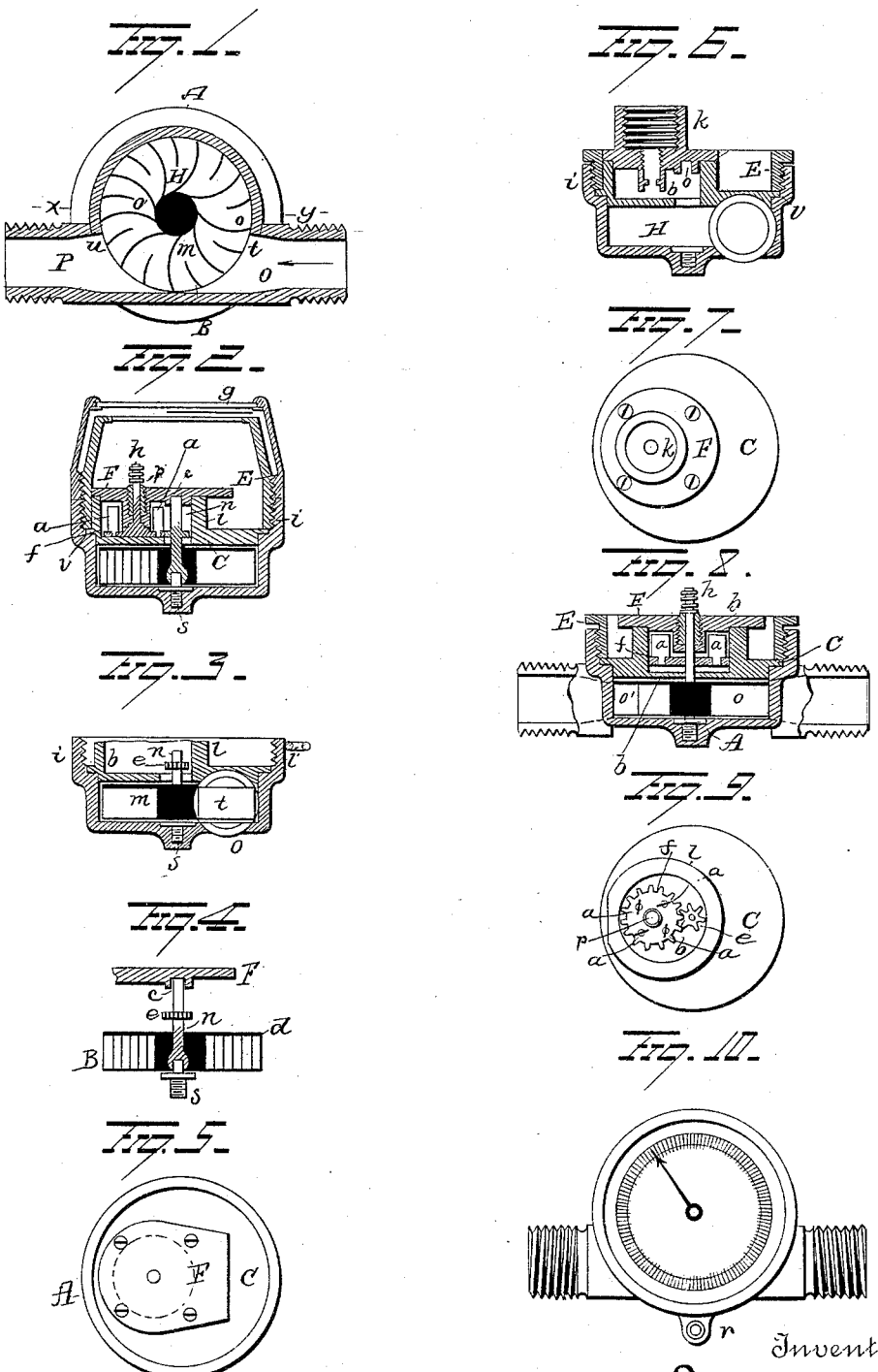
Witnesses
J. Nottingham
G. F. Downing
Inventor
F. A. Bishop
By his Attorney
H. A. Seymour

UNITED STATES PATENT OFFICE.

FRANCIS A. BISHOP, OF SAN FRANCISCO, CALIFORNIA.

ROTARY WATER-METER.

SPECIFICATION forming part of Letters Patent No. 432,929, dated July 22, 1890.

Application filed February 25, 1889. Serial No. 301,145. (No model.)

*To all whom it may concern:*

Be it known that I, FRANCIS A. BISHOP, a citizen of the United States, residing at San Francisco, in the county of San Francisco and State of California, have invented a new and useful Meter for Measuring the Velocity of Currents of Water, of which the following is a specification.

My invention relates to improvements in means for securing accuracy in measuring the velocity of water-currents passing through a meter, and also for cheapening its cost. I attain these objects by the mechanism in the accompanying drawings, in which—

Figure 1 is a plan of the meter in operating position, showing the case A and wheel-chamber H on a plane, with the top of the vanes of measuring-wheel B inclosed therein. Fig. 2 is a vertical section of the meter, taken through the center of the case A and shells D and E on line of $x\,y$, Fig. 1. Fig. 3 is a vertical section of the meter-case, taken through the center, but at right angles to the line $x\,y$, Fig. 1, showing the position of tangential inlet O, which is partly broken away to exhibit the rectangular aperture $t$ that faces and is adjacent to the vanes of the measuring-wheel. Fig. 4 is a vertical section of the measuring-wheel B, with its axle in place on pivot and in socket. Fig. 5 is a plan of head or cover C in position inside of case A, also showing the cap F in its place on C. Fig. 6 is a vertical section of the meter-case, taken on the line $x\,y$, Fig. 1, showing a means whereby the register may be located vertically at a distance away from the meter. Fig. 7 is a plan showing the head C, the cap F, and screwed neck $k$ of Fig. 6. Fig. 8 is a vertical section of meter modified for large sizes and showing the shell E as arranged when the register is not directly in contact with the body of meter. Fig. 9 is a plane of the head C, exposing the chamber $b$ with the pinion, wheel, and regulating-vanes. Fig. 10 is an outside plan view of meter when in its compact form and in position for use.

Similar letters refer to similar parts through the several views.

A is the circular case or chamber, of metal, with movable cover for containing the measuring-wheel B, and it is also provided with a tangential inlet O and outlet P, as shown in Fig. 1. The measuring-wheel revolves in said case conformably to the impulse of the passing current of water, and its revolutions are regulated and duly registered for observation by suitable devices. The cross-section of the inlet and outlet apertures at $t$ and $u$ are rectangular in form, but their sides in plane with the measuring-wheel B are curved to suit its face, as shown in Fig. 1, due space for clearance being allowed. A line drawn from $t$ to $u$, and parallel to $x\,y$, is tangent to and touches the hub $m$ of the measuring-wheel. By this arrangement the entire stream of water flowing through is guided directly to the vanes of the wheel without practical change of sectional area during its passage, thus enabling the measuring-wheel to register a very slow velocity of current.

The measuring-wheel is composed of ebonite, indurated wood fiber, or such durable material as will nearly approach the specific gravity of water. Its parts consist of a thin circular disk $d$, with a central hub $m$, and properly curved radiating vanes $o\,o\,o'\,o'$, and form a wheel, as shown in Figs. 1, 4, and 8. The vanes $o\,o$ have one end attached to the hub $m$ and one side to the disk $d$, all component therewith, making a light and strong wheel. The short vanes $o'\,o'$ are placed alternately on the disk, and are component therewith, one end of vane being at periphery of wheel, as shown. The objects of the short vanes are twofold—to aid in preventing the wheel from overrunning the current under high velocities by permitting a circulation of water among the vanes, and to increase the sensitiveness of the wheel when subject to low velocities.

The number of vanes for a wheel depend upon the quantity desired to measure in a given time. I find that a meter connected with a conduit having an internal diameter of three-fourths of an inch may have from sixteen to eighteen vanes, long and short, with satisfactory results. The short vanes $o'\,o'$ may be dispensed with when construction of the meter is undertaken for definite velocities, the number of long vanes $o\,o$ being adjusted in connection with the regulating fan-vanes, described in another place. The axle n, which is solidly fixed in the hub m of the measuring-wheel and carrying the pinion e, is supported at its lower end upon the pivot s, and the socket-bearing c in the cap F receives its upper end, as shown in Figs. 2 and 4. The body of the meter above the wheel-chamber H is enlarged to form a seat for the flange v of the head C, also to make the rim i, as shown in Figs. 2, 3, 6, and 8. The office of said rim is to support the shells D and E, Fig. 2, or shell E, with its upper part removed and leaving a flanged rim, as shown in Figs. 6 and 8, should it be necessary to separate the registering mechanism from the body of the meter. The rim i is provided with an internal screw-thread and the inner shell E is provided with an external thread at its lower end, which screws into the rim, as shown. When E is screwed home upon the flange of the head C, that member is held rigidly in place. The screw-thread on E is somewhat longer than the depth of the rim i. The outer shell D, having a suitable internal screw-thread at its bottom, passes down over E until the rim i is met. Lugs r r'—one on the rim i and the other on the shell E—so adjusted as to come one over the other when in place, afford a way for locking or sealing the parts together. The upper end of shell D supports a glass plate g, and the upper end of the inner shell E supports the dial or dials, as shown in Fig. 2. The head C, covering the measuring-wheel, has a flange v upon its periphery. This is fitted to its seat with a water-tight joint. The raised rim l is made a part of the head, and is of such internal diameter that when fixed in its eccentric or concentric position the center of C will be inclosed therein. The cap F is also flanged and is fitted upon top of l with a water-tight joint and is held in place by screws passing through the flange into the rim. When necessary for support of the register-work, the flange of F is extended, as shown in Fig. 5. A hole in the center of the head C admits the passage of the axle n, and its pinion e. When the cap F is in place, it will be seen that a chamber b, Figs. 3 and 6, is formed, and that it communicates with the measuring-wheel chamber through the hole in the center of the head.

Within the chamber b operate the driving-pinion e and the toothed wheel f on its axle p, as shown in Figs. 2 and 9. The axle p passes through the cap F, a suitable stuffing-box and gland being provided for cutting off the water from the chamber b. At the top of p is mounted the worm-wheel h. This worm imparts the motion of the measuring-wheel to a train of gear-work for registering its revolutions by aid of dials and pointers. Said train is not shown in the drawings, there being a number of devices in common use for accomplishing registration.

On the upper face of the wheel f, Figs. 2 and 9, are placed the metal fan-vanes a a a a, which assist in regulating the speed of the measuring-wheel D. These vanes are so secured to f that they may be adjusted on their vertical axes and given a certain degree of obliquity, as shown. The resistance to these vanes is the water in the chamber b. When in a radial position, as regards the diameter of f, the vanes offer the greatest resistance. In large meters these regulating-vanes a a a, supported on radial arms or a disk, will be placed around the axle n in a chamber similar to b, but concentric with the head C, as shown in Fig. 8.

It will be evident that an axle coming from the chambers b can be extended for a distance upward, and that the worm-wheel h and the registering-train can be placed equally well at the terminus. By this arrangement the meter can be placed below the frost-line of the ground and have the register near the surface; or the meter may be carried (through a suitable well) to the water beneath a ship's bottom, and have a register above on the deck or bridge to record the forward movement of the ship. Should any extension of an axle from the chambers b be required, a protecting-tube will inclose it to the extent of its length, the lower end of the tube being screwed into a neck k, as shown in Figs. 6 and 7.

I am aware that prior to my invention, meters have been made with rotary measuring-wheels and that regulating-vanes have been used in such connection; also, that measuring-wheels have been employed for obtaining the speed of ships. I therefore do not claim such a combination, broadly, but What I do claim as my invention, and desire to secure by Letters Patent, is—

1. The combination, with a casing having inlet and outlet openings angular in cross-section and located in line with each other, of a measuring-wheel having vanes, each equal in area and conforming in shape to the cross-section of the inlet-opening, substantially as set forth.

2. The combination, with a casing having inlet and outlet openings rectangular in cross-section, and located in line with each other, of a measuring-wheel having a series of vanes o, each being equal in area and conforming in shape to the cross-section of the inlet-opening, and a series of smaller vanes o' located between the vanes o, substantially as set forth.

3. The combination, with a casing having inlet and outlet openings, the former being rectangular in cross-section, of the wheel having vanes o, each being equal in area and conforming in shape to the cross-section of the inlet-opening, and a series of smaller vanes o' located between the vanes o, substantially as set forth.

4. In a meter, the combination, with a casing having two communicating chambers of unequal size, the large chamber having inlet and outlet openings located in line with each other, and a measuring-wheel located within said chamber, the axle of said measuring-wheel extending into the smaller chamber, of a wheel driven by the axle of the measuring-wheel and located within the smaller chamber, a shaft attached to said driven wheel for actuating the registering mechanism, and vanes attached to said driven wheel for retarding and regulating its movement, substantially as set forth.

5. The combination, with a casing having two communicating chambers, the lower chamber having inlet and outlet openings located in line with each other, and a measuring-wheel located within said lower chamber between the openings therein, of a wheel driven by the measuring-wheel and located within the upper chamber, and vanes adjustably attached to said driven wheel for retarding and regulating its movements, substantially as set forth.

F. A. BISHOP.

Witnesses:
G. WHIFFIN,
ARTHUR J. LIVINGSTONE.